April 1, 1969  A. N. HALE  3,435,790
INTERMITTENT OUTPUT TRANSMISSION

Filed May 12, 1967  Sheet 1 of 4

INVENTOR
ARTHUR N. HALE

BY Mason, Porter, Diller & Brown
ATTORNEYS

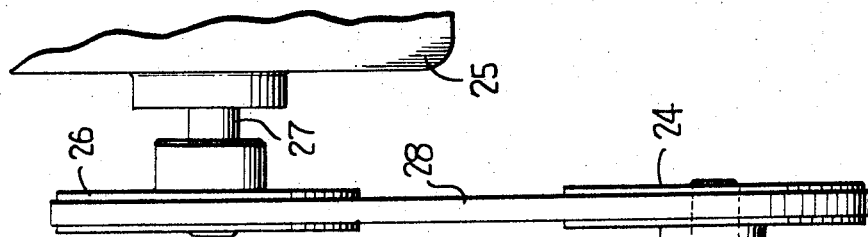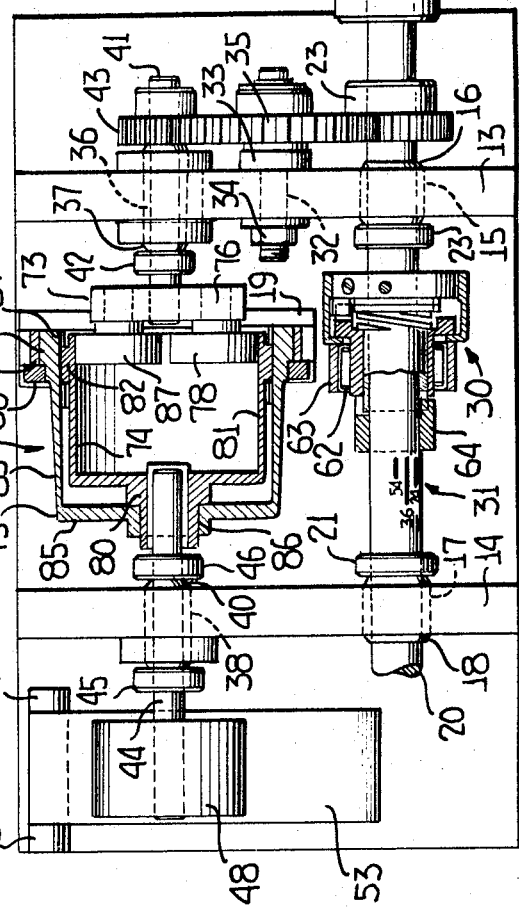

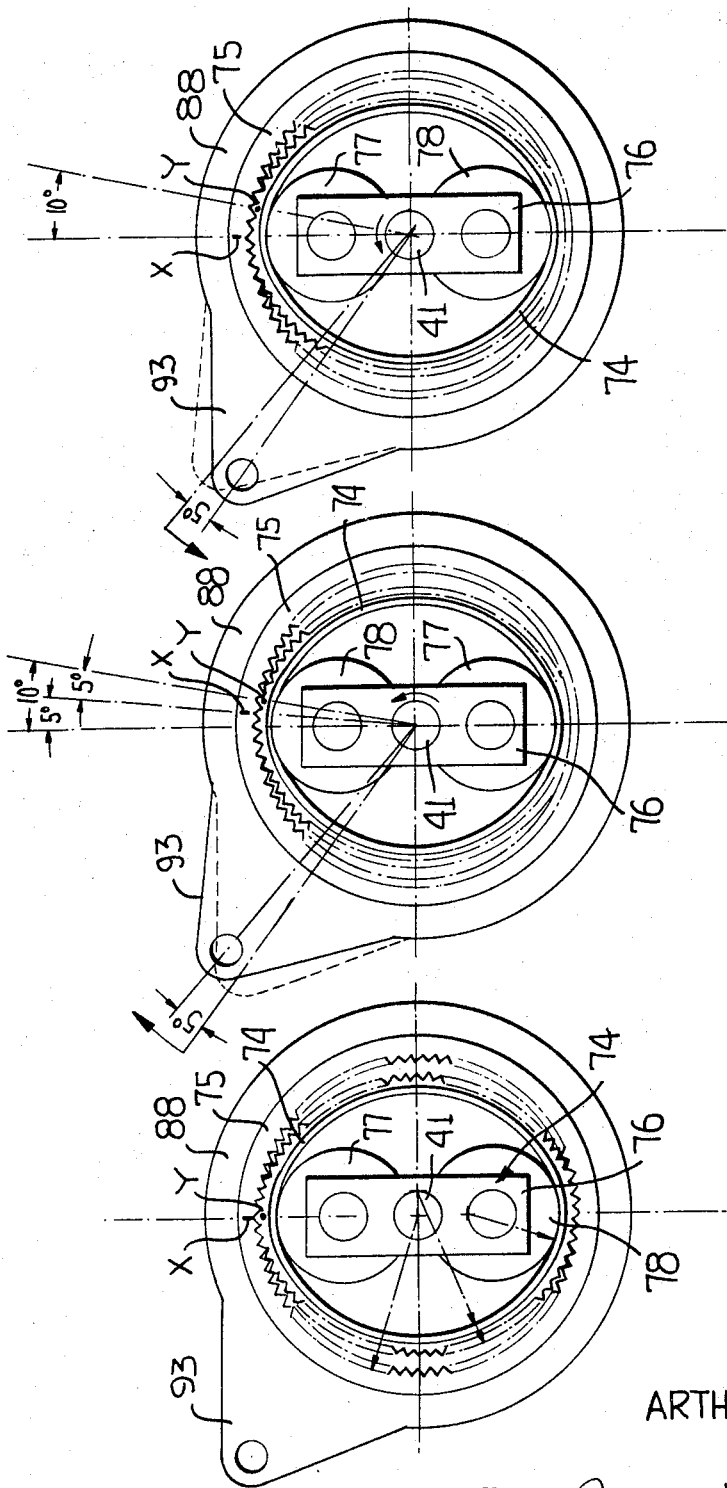

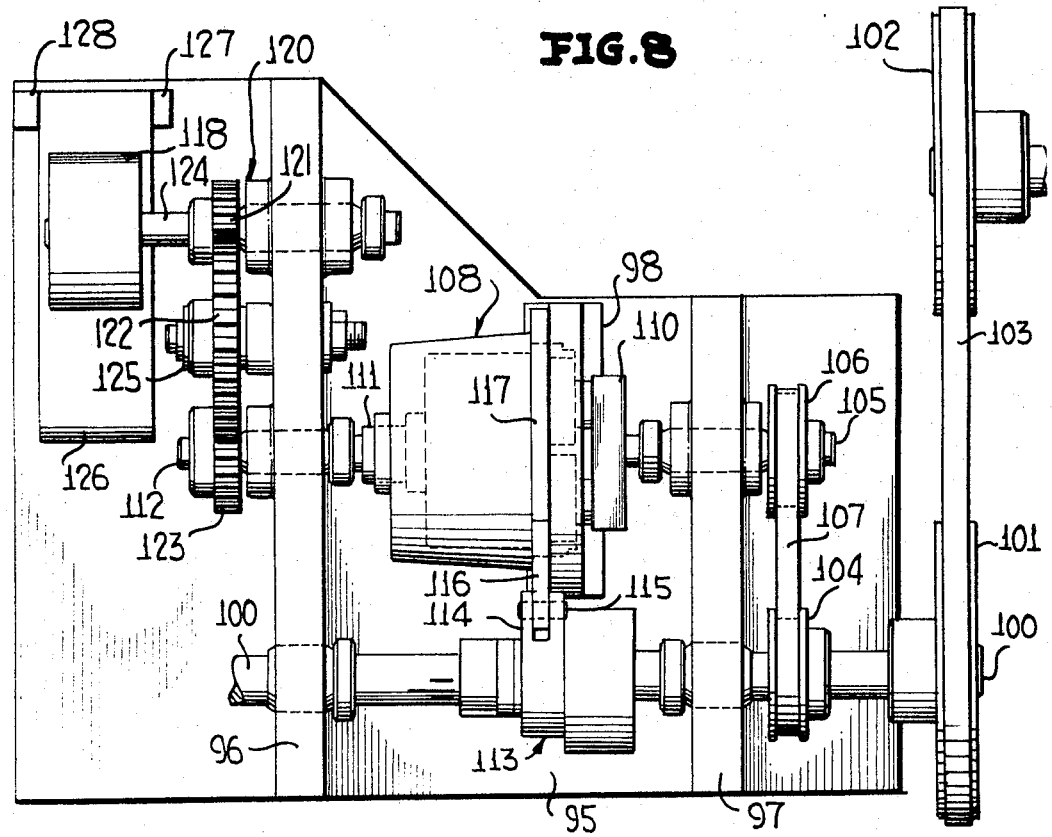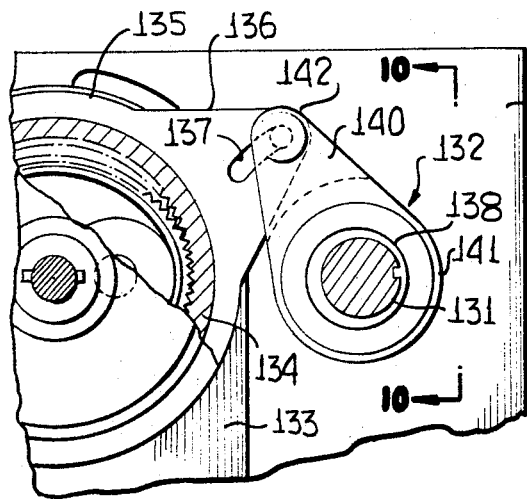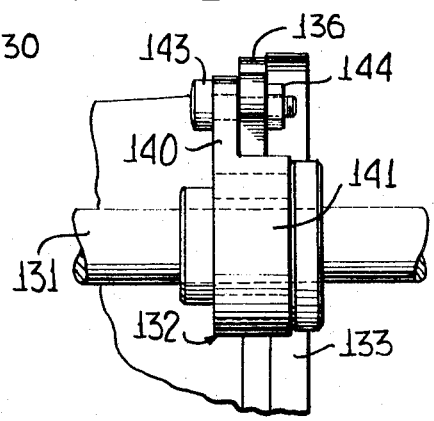

United States Patent Office
3,435,790
Patented Apr. 1, 1969

3,435,790
INTERMITTENT OUTPUT TRANSMISSION
Arthur N. Hale, Park Ridge, Ill., assignor to Union Special Machine Company, Chicago, Ill., a corporation of Illinois
Filed May 12, 1967, Ser. No. 638,007
Int. Cl. D05b 27/10; F16h 3/78
U.S. Cl. 112—214                    28 Claims

ABSTRACT OF THE DISCLOSURE

This disclosure relates to a speed reducer and a mechanism connected to the speed reducer and coupled with the input to the speed reducer, which, when actuated, is operative to effect cyclic intermittent output motion of the speed reducer. In particular, an eccentric drive is provided for pivoting a normally fixed member of a strain wave speed reducer in order to achieve the intermittent output.

---

This invention relates to a novel mechanism for providing controlled intermittent motion for a speed changer device, and is particularly useful in providing a cloth feed motion for sewing machines and the like.

In the past, various devices have been developed which were capable of achieving large reductions or increases of motion between their input and output end. However, when it has been necessary to translate the output power of a transmission, for example, of a speed reducer, to have controlled intermittent motion, it has been necessary to attach to the output shaft of the speed reducer an additional mechanism specifically adapted for the purpose of achieving the intermittent motion. Such additional mechanisms, in combination with a speed changer require numerous additional components, thus are substantially costly and may be cumbersome where space considerations for the numerous parts are important. The present invention seeks to obviate the above and other undesirable features of prior art speed changing devices in providing a speed changing device having an input and an output, and a means integrally associated with the speed changer device whereby the output of the speed changer has intermittent cyclic motion.

Accordingly, it is a primary object of this invention to provide a speed changer device having an input member capable of receiving power at a constant given speed, and an output member normally capable of delivering power at a different constant output speed, but wherein means are provided, integrally associated with the device for varying the motion of the output member.

It is another object of this invention to accomplish the above object, wherein the speed changer device is a strain wave gearing transmission of the general type disclosed in United States Patent No. 2,906,143, granted Sept. 29, 1959 to C. W. Musser, including a normally fixed member, and the variation in the motion of the output member is achieved by moving the normally fixed member.

It is a further object of this invention to provide a speed changer device which includes a speed reducer having an input member and an output member, and means for effecting cyclic intermittent motion of the output member of the speed reducer.

It is a further object of this invention to provide a speed changer device having an input shaft and an output shaft, and which is operative to both substantially reduce a constant input speed and to vary the constant input speed such that an output shaft has intermittent motion.

It is another object of this invention to provide a speed changer having a means for achieving cyclic intermittent motion of its output shaft, wherein a speed reducer is employed which has a rotatable input shaft, a flexible member having teeth, a rigid member having teeth, and means for urging some of the teeth of the flexible member into engagement with some of the teeth of the rigid member, wherein one of the members is normally fixed, and the intermittent motion of the output shaft is achieved by oscillating the normally fixed member.

It is another object of this invention to provide a speed changer having a speed reducer, and means operatively associated with the speed reducer for oscillating a normally fixed member of the speed reducer by means of an eccentric mounted on a rotating shaft, in combination with a pitman, whereby the motion of the output shaft of the speed reducer is a combination of a straight speed reduction and a pivotal oscillatory motion provided by the eccentric, the combined motion being cyclically intermittent.

It is yet another object of this invention to accomplish the above object wherein the eccentric is adjustably positionable on its shaft.

It is a further object of this invention to provide a speed changer device for achieving intermittent cyclic motion of a cloth feed member of a sewing machine, wherein a speed reducer is employed in combination with an outside oscillatory motion to provide at the output of a speed reducer an intermittent reduced speed, as compared to the input speed of the speed reducer.

With the above and other objects in view that will hereinafter appear, the nature of the invention will be more clearly understood by reference to the following detailed description, the appended claims and the several views illustrated in the accompanying drawings.

In the drawings:

FIGURE 4 is a top plan view, partly in section, taken along the line 4—4 of FIGURE 1, and wherein the details of the speed reducer and adjustable eccentric are best illustrated.

FIGURE 5 is an enlarged fragmentary transverse sectional view through the adjustable eccentric and a portion of the speed reducer mechanism of this invention, taken along the line 5—5 of FIGURE 1.

FIGURE 6 is an enlarged top perspective view of an adjustment collar for the adjustable eccentric of this invention.

FIGURE 7 is an enlarged cross-sectional view of the speed reducer mechanism of this invention, wherein the normally fixed member of the mechanism is illustrated in position, prior to oscillation thereof.

FIGURE 7A is a view similar to that of FIGURE 7, but wherein the normaly fixed member of the speed reducer mechanism is illustrated in a position of clockwise rotation, relative to the disposition of the fixed member illustrated in FIGURE 7, after counter-clockwise rotation of the input shaft 180 degrees.

FIGURE 7B is a view similar to that of FIGURE 7A, but wherein the normally fixed member has been rotated in a counter-clockwise direction, back to its original position illustrated in FIGURE 7, and wherein the input shaft has been rotated in a counter-clockwise direction an additional 180 degrees.

FIGURE 8 is a top plan view of an alternative speed change apparatus of this invention, utilizing a belt type input shaft drive means.

FIGURE 9 is an enlarged fragmentary view similar to that of FIGURE 5, but wherein a fixed eccentric having a slotted hole adjustment in the crank arm is provided for oscillating the normally fixed member of the speed reducer mechanism.

FIGURE 10 is an enlarged fragmentary elevational view of the fixed eccentric of FIGURE 9, taken along the line 10—10 of FIGURE 9.

Figure 1:
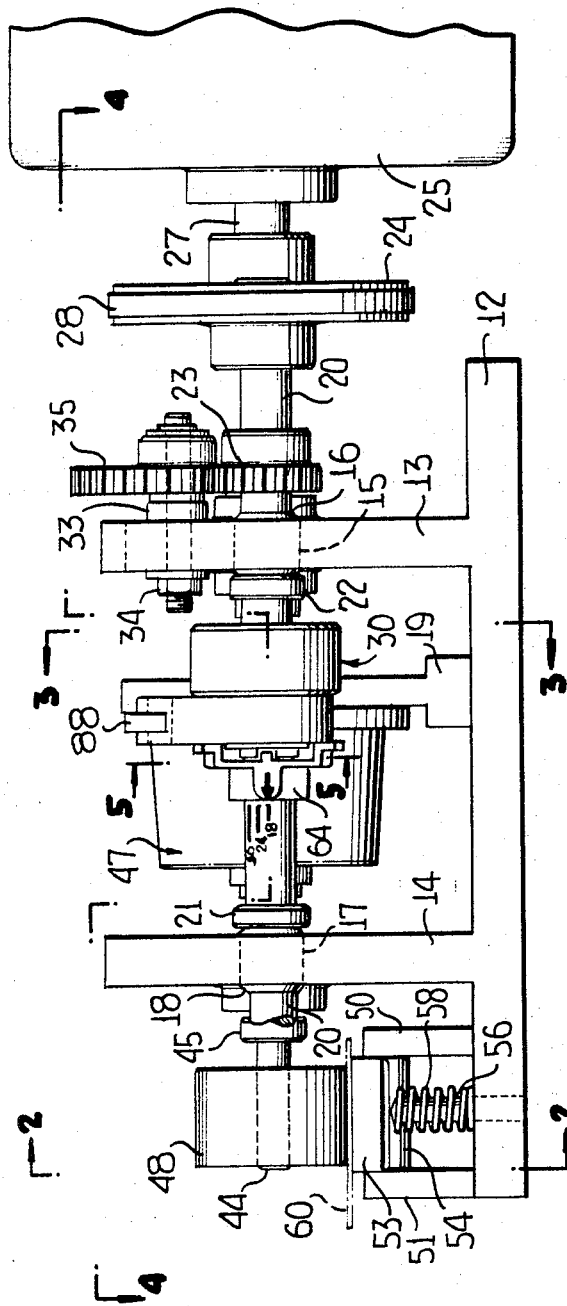
FIGURE 1 is a front elevational view of the speed changer device of this invention, with a motor drive segmentally illustrated, adapted for use with a sewing machine, wherein the output shaft of the speed changer device carries a cloth feed wheel.
Figure 3:
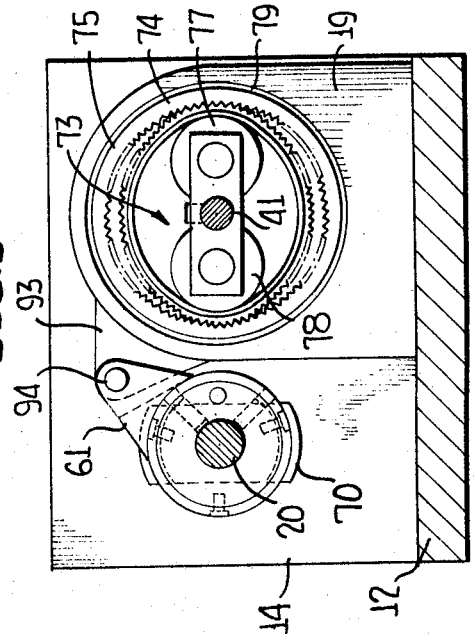
FIGURE 3 is a cross-sectional view taken along the line 3—3 of FIGURE 1, and wherein the operative relation of the speed reducer elements is illustrated.

Referring now to the drawings in detail reference is first made to FIGURE 1 wherein there is illustrated a base plate 12 having upstanding supports 13 and 14. The support 13 is provided with a bore 15, in which is press-fitted a bearing sleeve 16. Similarly, the support 14 is provided with a bore 17 in which is press-fitted a bearing sleeve 18. A shaft 20 is carried in the sleeves 16 and 18. A pair of collars 21 and 22 are provided, secured to the shaft 20 by means of set screws or the like (not shown) to retain the shaft 20 against longitudinal movement within the bearing sleeves 16 and 18.

The shaft 20 carries a spur gear 23, keyed thereto or secured by some suitable means. The shaft 20 has a pulley member 24 secured to its extreme right end, as viewed in FIGURE 4.

An electric motor 25 is provided, having a drive pulley member 26 secured to an output shaft 27 thereof. A drive belt 28 is provided, connecting pulley members 24 and 26. The drive belt 28 may be toothed, or a standard V-belt, as desired.

The shaft 20 carries an adjustable eccentric thereon, generally designated by the numeral 30, between the collars 21 and 22. Indicia, generally designated by the numeral 31 are provided on the shaft 20 for selectively positioning the adjustable eccentric 30, as desired, in a manner later to be described.

The support 13 is provided with a slotted hole 32, in which is secured a stud 33 by means of a lock nut 34. The stud 33 carries an idler gear 35 adjustably engaged with the gear 23 on the shaft 20.

The support 13 is also provided with a bore 36, in which is positioned a bearing sleeve 37. Similarly, the support 14 is provided with a bore 38 in which is positioned a bearing sleeve 40.

The bearing sleeve 37 carries a speed reducer input shaft 41, secured against longitudinal movement by a collar 42 at the left end thereof, as viewed in FIGURE 4, and carries a spur gear 43 at the right end thereof, in engagement with the gear 35 on the stud 33.

The gears 23 and 43 are matched with the idler gear 35 to provide the shaft 41 with the desired speed ratio relative to the shaft 20. Thus, the speed of the shaft 41 may be equal to, greater than, or less than the speed of the shaft 20.

The bearing sleeve 38 carries a shaft 44 therein, secured against longitudinal movement by a pair of collars 45 and 46. The shafts 41 and 44 carry therebetween a strain wave gearing type of speed reducer device generally designated by the numeral 47, and later to be described in detail.

The left end of the shaft 44, as viewed in FIGURE 4, carries a cloth feed wheel 48, secured thereto by a suitable key means (not shown) or the like.

The base member 12 carries upstanding guide support members 50 and 51, having a shaft 52 carried therebetween. A cloth guide plate 53 has a depending boss 54 with a bore 55 extending therethrough, for pivotally securing the cloth guide plate 53 on the shaft 52. An upstanding pin 56 is provided, in press-fit engagement in a bore 57 of the base plate 12. The pin 56 acts as a spring guide for a compression spring 58 disposed between the base plate 12 and the cloth guide plate 53.

Figure 2:
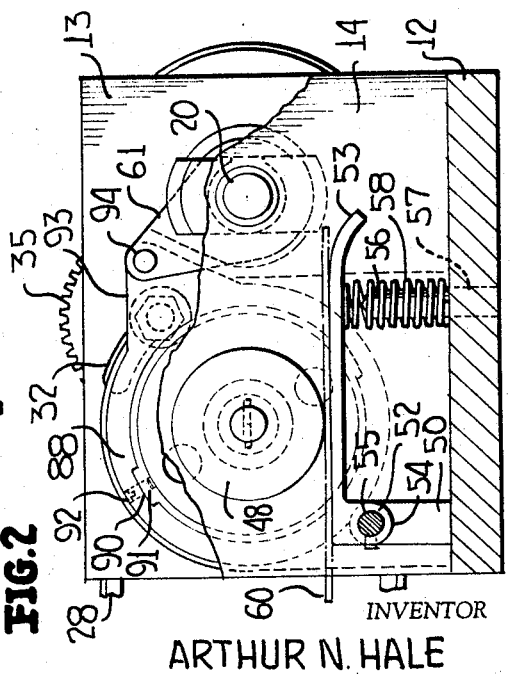
FIGURE 2 is an end elevational view, partly in section, of the speed changer device illustrated in FIGURE 1, taken along the line 2—2 of FIGURE 1, and wherein the cloth feed wheel and cloth guide plate are best illustrated.

In FIGURE 2 there is illustrated in phantom a piece of cloth 60, disposed between the cloth feed wheel 48 and the cloth guide plate 53.

The adjustable eccentric 30 is constructed generally according to the disclosure of the adjustable eccentric in United States Patent No. 2,643,625, and has mounted thereon a pitman 61 with frictionless rolling elements 62 forming a bearing between the adjustable eccentric 30 and a strap portion 63 of the pitman 61. An adjustment collar 64 is provided, best illustrated in FIGURE 6. The adjustment collar 64 comprises a shaft-engaging portion 65 having longitudinally extending spacer portions 66 and 67, terminating in outwardly directed flange portions 68 and 70, respectively. A longitudinally disposed lug 71 is provided, extending from the shaft engaging portion 65, adapted to engage within a mating slot of an inner eccentric (unnumbered) for relative positioning of inner and outer eccentrics of the adjustable eccentric 30, in the manner of the disclosure of the above-mentioned patent. The collar 64 is provided with an arrow 72, or other suitable indicia, for determining the desired positioning of the adjustable eccentric 30 with respect to the indicia 31 on the shaft 20.

The speed reducer device 47 comprises a wave generator member 73, a relatively flexible inner member 74, and a relatively rigid outer member 75.

The wave generator member 73 includes a carrier block 76 mounted on the input shaft 41, and has two roller members 77 and 78 carried therein, and mounted for rotation relative to the carrier block 76. The roller members 77 and 78 are longitudinally disposed on opposite sides of the longitudinal axis of the shaft 41 with the axes of rotation of the roller members 77 and 78 displaced 180 degrees as measured from the longitudinal axis of the shaft 41.

The flexible inner member 74 is normally of plastic construction, and of generally cup-like configuration, having longitudinally extending output shaft portion 80 at one end thereof, keyed or otherwise secured to the shaft 44. The flexible inner member 74 has a generally smooth inner surface 81 and a toothed periphery 82 at one end of the outer periphery thereof.

The rigid outer member 75 is also of generally cup-like configuration and comprises an annular portion 83 having an end flange 84 at one end thereof, an end wall 85 at another end thereof, with the end wall 85 being provided with a bearing surface 86 for the output shaft portion of the flexible member 74. The rigid member 75 is rotatably carried in a bearing 89 journalling portion 84. The bearing 89 is carried by an upstanding support 19 mounted on the base plate 12. The annular portion 83 of the rigid member 75 is provided at its inner surface thereof with a toothed portion 87.

With particular reference to FIGURE 5, it is readily seen that the flexible inner member 74 has an outer circumference normally substantially less than the inner circumference of the rigid member 75, in the area of the teeth 82 and 87. With the insertion of the wave generator 73 against the inner surface 81 of the cup-like flexible member 74, the rollers 77 and 78 press against opposite portions of the flexible member surface 81, thereby elliptically deflecting the flexible member 74 such that toothed portions 82 of flexible member 74 opposite the rollers 77 and 78 matingly engage toothed portions 87 of the rigid member 75. Thus, upon rotation of the wave generator 73, the rollers 77 and 78 will traverse the inner surface 81 of the flexible member 74, causing toothed portions 82 of the flexible member 74 which are opposite either one of the rollers 77 or 78 at any given time, to engage corresponding toothed portions 87 of rigid member 75 which are also opposite either of the roller members 77 or 78 at that given time.

Thus, upon rotation of the wave generator 73, an induced deflection wave travels around the toothed periphery 82 of the flexible member 74, causing tooth engagement with toothed portions 87 of the rigid member 75 at sequential points around the circumference of the toothed portion 82 of the flexible member 74. Accordingly, each tooth of the flexible member 74 moves radially into and out of engagement with teeth of the rigid member 75 as a tooth on the flexible member 74 progresses from one tooth to the next of the rigid member 74, tracing during this motion a curve which is generally of the character of a sinusoidal wave. This motion has led to the term "strain wave gearing." The teeth of both the flexible member 74 and the rigid member 75 are of the same diametral pitch, and there are fewer teeth on the flexible member 74 than on the rigid member 75, causing a relative circumferential movement of the flexible member 74 with respect to the rigid member 75, as the wave generator 73 is rotated. Thus, the reduction ratio between the speed reducer device 47 may be calculated from the difference in the number of teeth between the toothed portions 82 and 87 of the flexible and rigid members 74 and 75 respectively.

It has been found that the difference in the number of teeth between the flexible member 74 and the rigid member 75 should be equal to or a multiple of the number of contact points at which the flexible member 74 is deflected to cause tooth engagement with the rigid member 75. Thus, for the wave generator 73, utilizing two rollers 77 and 78, over two contact points, the tooth differential between the flexible and rigid members 74 and 75 respectively should be two or four teeth. It is assumed that in the embodiment illustrated in FIGURE 4, the flexible and rigid members 74 and 75 therefore are provided with 160 and 162 teeth respectively. Upon rotation of the wave generator, for example, in the counter-clockwise direction of the shaft 41 in FIGURES 7A and 7B, the flexible spline will move in a clockwise direction at a greatly reduced speed. In this particular embodiment, the speed reduction is 80 to 1.

A collar member 88 is clamped to the rigid outer member 75 by means of slots 90 in the inner periphery of the collar 88 in locked engagement with lugs 91 integral with the rigid member 75. The collar or strap portion 88 is secured against the flange portion 84 of the rigid member 75 also by means of screws 92. The collar 88 has protruding therefrom and integral therewith a crank lever arm 93 which is pivotally secured to the pitman 61 by means of a shaft 94. Thus, upon rotation of the shaft 20, the eccentric 30, operating through the pitman 61 will provide the crank arm 93 with an oscillatory throw or pivotal motion which is cyclically dependent upon the speed of rotation of the shaft 20.

Reference is now made to FIGURES 7, 7A and 7B. It is assumed that the driving relation between shafts 20 and 41 is 1:1. Thus a single revolution of the drive shaft 20 is translated into a single revolution of the input shaft 41, in the embodiment illustrated. For purposes of illustration a pair of radially aligned marks X and Y are shown in FIGURE 7 on the rigid and flexible members 75 and 74 respectively, to illustrate the relative positions of the rigid and flexible members 75 and 74 prior to rotation of the input shaft 41 and pivoting of the collar member 88. Upon counterclockwise rotation of the input shaft 41, for an arc of 180 degrees, whereby the rollers 77 and 78 are moved from their positions illustrated in FIGURE 7 to their positions illustrated in FIGURE 7A, depending upon the number of teeth in the flexible and rigid members 74 and 75, as well as the ratio between the shafts 20 and 41, the flexible member 74 may be pivoted in a clockwise direction for an amount of, for example, 10 degrees, from its position illustrated in FIGURE 7 to its position illustrated in FIGURE 7A. The pivotal movement of the flexible member 74 during the 180 degrees rotation of the shaft 41 is clearly illustrated by reference to the 10 degree movement of the mark Y in FIGURE 7A. Simultaneously with this above-mentioned rotation of the shaft 41 for the amount of 180 degrees to the position illustrated in FIGURE 7A, the crank arm 93 is pivoted an amount equal to one half the arcuate displacement of the flexible member 74, or 5 degrees, in a clockwise direction, as illustrated in FIGURE 7A. As the arm 93 is pivoted in a clockwise direction, the rigid member 75 is also pivoted 5 degrees as is clearly illustrated in FIGURE 7A by the displacement of the mark X on the rigid member 75.

Continued rotation of the input shaft 41 in the counter-clockwise direction illustrated in FIGURE 7B, with concurrent counter-clockwise displacement of the arm 93 and consequent counter-clockwise displacement of the rigid member 75 through a 5 degree arc will return the rigid member 75 to its original position illustrated by the position of the mark X in FIGURE 7B. Thus, when two rollers 77 and 78 are utilized with flexible and rigid members 74 and 75 having a tooth differential which is a multiple of the number of rollers or contact points of the wave generator 73 with the flexible member 74, and the arm 93 is oscillated through a stroke equal to half the normal relative arcuate displacement between flexible and rigid members 74 and 75, with one 360 degree revolution of the wave generator 73, the pivotal movement of the collar 93 when moved in the direction illustrated in FIGURE 7A, will add to the relative angular displacement between the members 74 and 75 during the first 180 degrees rotation of the input shaft 41, and will subtract from the relative displacement of the members 74 and 75 during the second 180 degrees rotation of the shaft 41. In this manner the relative rotational displacement between members 74 and 75, which is effected by the speed reducer device 47 of this invention and the oscillatory pivotal movement of the rigid member 75 through the eccentric 30 and crank arm 93 are always superimposed such that the resultant angular displacement of the flexible member 74 is doubled during the first half rotation of the input member 41 and is zero during the second half rotation of the input member 41. The output shaft portion 80 of the flexible member 74 thereby is provided with a cyclically intermittent rotational movement.

It is readily apparent that any desired intermittent rotation of the output shaft portion 80 of the flexible member 74 may be obtained depending upon the drive ratio between the shafts 20 and 41 upon selection of gears 23 and 43 to give a desired ratio, the number of rollers 77 and 78 or other means for effecting contact points of toothed portions 82 and 87 on the flexible and rigid members 74 and 75 respectively, the tooth differential between the flexible and rigid members 74 and 75, and the relative circumferences of the flexible and rigid members 74 and 75, measured along the toothed portions 82 and 87 thereof respectively.

In achieving the desired intermittent motion, the adjustability of the eccentric 30 serves to bring about the correct amount of oscillation, the oscillation being movement in one direction and a return movement. This movement in one direction must correspond to exactly one-half the amount of relative movement between the gear-like members 74 and 75 during one full rotation of the drive shaft 20 on which the eccentric 30 is carried, and which drive shaft 30 imparts driving motion to the input shaft 41. Thus, the eccentric 30 must be adjusted in accordance with the relative movement between the members 74 and 75, which occurs during each half rotation of the drive shaft 20. If that relative movement is caused to change, for example, by altering the ratio between the drive shaft 20 and the input shaft 41, then the eccentric throw must be readjusted in accordance with the new relative motion between the members 74 and 75, to achieve the desired intermittent output motion.

Also, other types of wave generators 73 may be utilized, other than those having rollers 77 and 78 thereon, such as one having an elliptically shaped member contacting the inner surface 81 of the flexible member 74.

Furthermore, it is to be noted that various other combinations may be achieved with a wave generator, a flexible member, and a rigid member, such as a speed multiplier, rather than a speed reducer and that various ones of the wave generator 73, flexible member 74, and rigid member 75, may comprise the input member, the output member, or be pivoted, as desired to achieve a desired motion. The shafts 20 and 41 may also be separately driven, in uncoupled relation, as opposed to the interconnecting gear train illustrated in FIGURE 4.

The intermittent rotational motion of the output shaft portion of the flexible member 74 is transmitted through the shaft 44 to the cloth feed wheel 48, which engages the cloth 60 to intermittently feed the cloth 60 along the cloth guide plate 53 with a controlled intermittent motion.

In FIGURE 8 there is illustrated an alternative embodiment of the speed changer device of this invention comprising a base part 95, having upstanding supporting members 96, 97 and 98. The supporting members 97 and 98 carry an input shaft 100 therebetween, similar to the embodiment of FIGURE 4. The shaft 100 is provided with a suitable drive mechanism comprising pulley members 101 and 102 connected by a drive belt 103. The pulley 102 is driven by a motor (not illustrated). The shaft 100 carries a toothed pulley 104, and an input shaft 105 journalled in the support member 97 is also provided with a toothed pulley 106. A toothed belt 107 is provided, operatively connecting the pulleys 104 and 106. The pulleys 104 and 106 are selected to have a 1:1 drive ratio.

A speed reducer device 108 is provided between the support members 96 and 97, with the wave generator 110 thereof connected to the input shaft 105. An output shaft portion 111 of the speed reducer device 108 is operatively connected to an output shaft 112. The speed reducer device 108 is constructed similar to the device 47 illustrated in FIGURE 4, and will therefore not be described in detail again.

Generally, when a 1:1 drive ratio is desired, it will not be necessary to adjust an eccentric on the shaft 100 which provides pivotal motion for a normally fixed member of the speed reducer device 108. Therefore, a fixed eccentric 113 is provided on the shaft 100.

The fixed eccentric 113 has a pitman 114 attached thereto, which is connected by means of a shaft 115 to a crank arm 116 projecting from a collar 117 which is secured to the normally fixed rigid member (unnumbered) of the speed reducer device 108. Thus, during operation of the device illustrated in FIGURE 8, the oscillatory motion provided by the fixed eccentric 113 cannot be adjusted.

In order to provide some variation in the intermittent rotary motion of a cloth feed wheel 118, a gear train 120 is provided, having gears 121, 122 and 123 which are selected to provide the desired intermittent rotary motion of a cloth feed shaft 124, and consequently of the cloth feed wheel 118.

The driving gear 123 is carried by the shaft 112, and the driven gear 121 is mounted on the shaft 124 which is carried by the support member 96. The gear 122 is an idler gear, carried by a stud 125 mounted on the support member 96, for providing the shaft 124 with intermittent motion in the same direction as the motion of the shaft 112, and at the desired ratio, according to the gears selected.

A cloth guide plate 126 is also provided, disposed beneath the cloth feed wheel 118, and mounted on the base plate 95 by means of support members 127 and 128. Thus, it is readily seen that, even when a fixed eccentric 113 is used with the device of this invention, some variation in intermittent motion of the cloth feed wheel 118 can be obtained, by selection of the gears in the gear train 120.

In FIGURE 9 there is illustrated an alternative arrangement for adjusting the angular movement of the normally fixed rigid member. An upstanding support plate 130 carries a shaft 131 to which is connected a fixed eccentric 132. An upstanding support member 133 carries a normally fixed rigid member 134 for rotation therein. A collar 135 is fixedly mounted on the fixed member 134 and has a crank arm 136 protruding therefrom. An arcuate slotted hole 137 is provided in the crank arm 136.

The fixed eccentric 132 includes an eccentric sleeve 138 keyed or otherwise secured to the shaft 131. A pitman 140 is provided, having its lowest strap 141 rotatably journalling the fixed eccentric 132. An upper strap 142 of the pitman 140 is mounted on a shoulder stud 143 for pivotal movement thereabout, the stud 143 being rigidly secured to the crank arm 136 through the arcuate slotted hole 137, and fastened thereto by a nut 144. Selective positioning of the stud 143 within the arcuate slotted hole 137 adjusts the throw of the pitman 140 on the crank arm 136 and thereby varies the angular displacement of the normally fixed rigid member 134.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. A speed changer device comprising a movable input member, a movable output member, strain wave gearing means for transmitting motion between said input and output members, said gearing means including a rotatable geared member and a normally fixed member having gear teeth affixed thereto in meshing engagement with said rotatable geared member for determining the speed of rotation of said rotatable geared member, and means for varying the motion of the output member by moving said normally fixed member and the gear teeth affixed thereto for adding movement of the gear teeth to the rotation of the rotatable geared member.

2. The device of claim 1 wherein said gearing means includes an input driven member for rotating said rotatable geared member in meshing engagement with said fixed member, said varying means comprising means for oscillating said normally fixed member for applying the oscillatory movement thereof to said rotatable member in addition to the rotation applied to said rotatable member by said input driven member.

3. The device of claim 2 wherein said oscillating means comprises fully rotatable shaft means coupled to said input member.

4. The device of claim 1 wherein said varying means comprise means for effecting cyclic intermittent motion of said output member by oscillating said normally fixed member to cause driving of said rotatable member from both said input member and said normally fixed member.

5. A speed changer device comprising an input shaft means, a speed reducer means coupled to said shaft means and having an output shaft; said speed reducer means comprising a rigid member having drive teeth thereon, a relatively flexible member having drive teeth thereon, and means for urging teeth of said flexible member into engagement with teeth of said rigid member to achieve relative movement of said flexible and rigid members, one of said rigid members, flexible member and urging means comprising a normally fixed member; and means for effecting cyclic intermittent motion of said output shaft, said means for effecting including means for moving said normally fixed member in a first direction to increase the speed of said output shaft via the drive teeth of said rigid member and said flexible member and for moving said normally fixed member in a second direction to decrease the speed of said output shaft via the drive teeth of said rigid member and said flexible member.

6. The device of claim 5 wherein said means for effecting cyclic intermittent motion of said output shaft includes a means for oscillating said fixed member.

7. The device of claim 5 wherein said effecting means comprises a means for pivotally moving said normally fixed member.

8. The device of claim 7 wherein said latter means comprises an eccentric carried by a fully rotatably driven shaft and connected to said normally fixed member.

9. The device of claim 5 wherein said rigid member is said normally fixed member and said effecting means includes an eccentric driven by a fully rotatable shaft other than said input shaft means for oscillating said rigid normally fixed member.

10. The device of claim 8 wherein said eccentric is adjustably positionable on its shaft for varying the intermittent motion of said output shaft.

11. The device of claim 8 wherein said rotatably driven shaft and said input shaft means are mechanically coupled.

12. The device of claim 5 wherein said rigid member is said normally fixed member and said urging means is carried by said input shaft means.

13. The device of claim 12 wherein said flexible member is generally concentrically disposed about said urging means and inwardly of said rigid member, and said output shaft is carried by said flexible member.

14. The device of claim 13 wherein a greater number of teeth are provided in said rigid member than said flexible member.

15. The device of claim 12 wherein said effecting means includes an eccentric driven by a rotatable shaft for oscillating said rigid normally fixed member.

16. The device of claim 5 wherein a constant drive is provided for said input shaft means and said effecting means comprises means for alternately oscillating said fixed member, first in the direction of input shaft means drive and then opposite thereto.

17. The device of claim 16 wherein said effecting means includes an eccentric driven by a rotatable shaft for oscillating said rigid normally fixed member and wherein said input shaft means and said eccentric shaft are mechanically coupled.

18. The device of claim 10 wherein indicia are associated with said eccentric and its rotatable shaft for adjustably positioning said eccentric on said shaft.

19. The device of claim 8 wherein a collar is provided secured to said fixed member having a slotted connection to said eccentric, for adjusting the pivotal motion of said fixed member.

20. The device of claim 8 wherein said rotatably driven shaft and said input shaft means are mechanically coupled by belt drive means.

21. The device of claim 8 wherein said rotatably driven shaft and said input shaft means are mechanically coupled by selected gear drive means for correlating the speed of said input shaft means with the pivotal motion of said fixed member.

22. In a sewing machine, a mechanism for providing intermittent cloth feed including a speed changer device comprising an input shaft means, a speed reducer means of the strain wave gearing type operatively connected to said shaft means having an output shaft, means for effecting cyclic intermittent motion of said output shaft from said speed reducer means, wherein said speed reducer means includes a normally fixed member, said effecting means comprising means for pivotally moving said normally fixed member and means coupling the pivotal movement of the normally fixed member with said output shaft for adding said pivotal movement to said output shaft, and wherein a cloth feed wheel is carried by said output shaft.

23. The sewing machine mechanism of claim 22, in combination with a cloth guide member, said guide member being disposed opposite said feed wheel periphery defining a path of cloth travel therebetween.

24. The mechanism of claim 23 wherein said guide member is pivotally mounted and spring biased toward said feed wheel.

25. A method of achieving controlled cyclically intermittent motion comprising the steps of:
providing strain wave gearing having a flexible member and a rigid member one of which is normally fixed, and a wave generator;
driving the wave generator at a predetermined speed to effect constant relative movement between said flexible and rigid members;
and moving the normally fixed member in timed relation with the driving of the wave generator to alternately add the movement of the normally fixed member to the relative movement between the flexible and rigid members, and cancel the relative movement between the flexible and rigid members with the movement of the normally fixed member.

26. The method of claim 25 wherein a complete cycle of addition and cancellation of movement occurs during one oscillatory motion of the normally fixed member.

27. The method of claim 26 wherein a complete cycle of addition and cancellation of movement occurs during one revolution of the wave generator.

28. The method of claim 27 wherein the normally fixed member is the rigid member and the controlled cyclically intermittent motion comprises the composite motion of the flexible member.

References Cited

UNITED STATES PATENTS

| | | | |
|---|---|---|---|
| 1,815,419 | 7/1931 | Praetzel | 74—394 |
| 2,268,414 | 12/1941 | Meyer | 112—214 |
| 2,643,625 | 6/1953 | Reimer | 112—210 |
| 3,119,283 | 1/1964 | Bentov | 74—640 |
| 3,148,560 | 9/1964 | Woodward | 74—640 X |
| 3,166,949 | 1/1965 | Lapp | 74—640 X |
| 3,199,370 | 8/1965 | Prior | 74—640 |
| 3,214,999 | 11/1965 | Lapp | 74—640 X |
| 3,304,809 | 2/1967 | Hellen | 74—675 X |

ARTHUR T. McKEON, *Primary Examiner.*

U.S. Cl. X.R.

74—394, 679